United States Patent [19]
Watson

[11] Patent Number: 4,835,347
[45] Date of Patent: May 30, 1989

[54] SHIFTING WIRE SEQUENCE DIGITIZER SYSTEM

[75] Inventor: James S. Watson, Phoenix, Ariz.

[73] Assignee: CalComp, Inc., Anaheim, Calif.

[21] Appl. No.: 155,267

[22] Filed: Feb. 12, 1988

[51] Int. Cl.$^4$ .............................................. G08C 21/00
[52] U.S. Cl. .................................................. 178/19
[58] Field of Search ........................ 178/18, 19; 382/13

[56] References Cited

U.S. PATENT DOCUMENTS 4,661,656  4/1987  Rodgers et al. ........................ 178/18

Primary Examiner—Stafford D. Schreyer
Attorney, Agent, or Firm—Nutter, McClennen & Fish

[57] ABSTRACT

In a digitizer system, a grid comprises a group of X conductors and a group of Y conductors, each such group comprising a first and second set of conductors. The first set in each group is formed by looping a predetermined number of conductors back and forth across the grid active area so as to provide a plurality of crossing conductors segments. The second group is formed by looping a different number of conductors back and forth across the active area in the spaces between the conductors of the first set so as to provide a plurality of second set crossing conductor segments alternating with said first set crossing conductor segments. Due to the differing number of conductors in the sets and their alternate looping across the grid active area, the positional and directional polarity relationships between the crossing conductor segments shift across the active area, enabling segments to be distinguished from one another and treated as if they were separate and distinct wires. This shifting wire sequence conductor arrangement permits coverage of relatively large grid active areas with a minimal number of multiplexers for switching the conductors to signal processing circuitry.

22 Claims, 6 Drawing Sheets

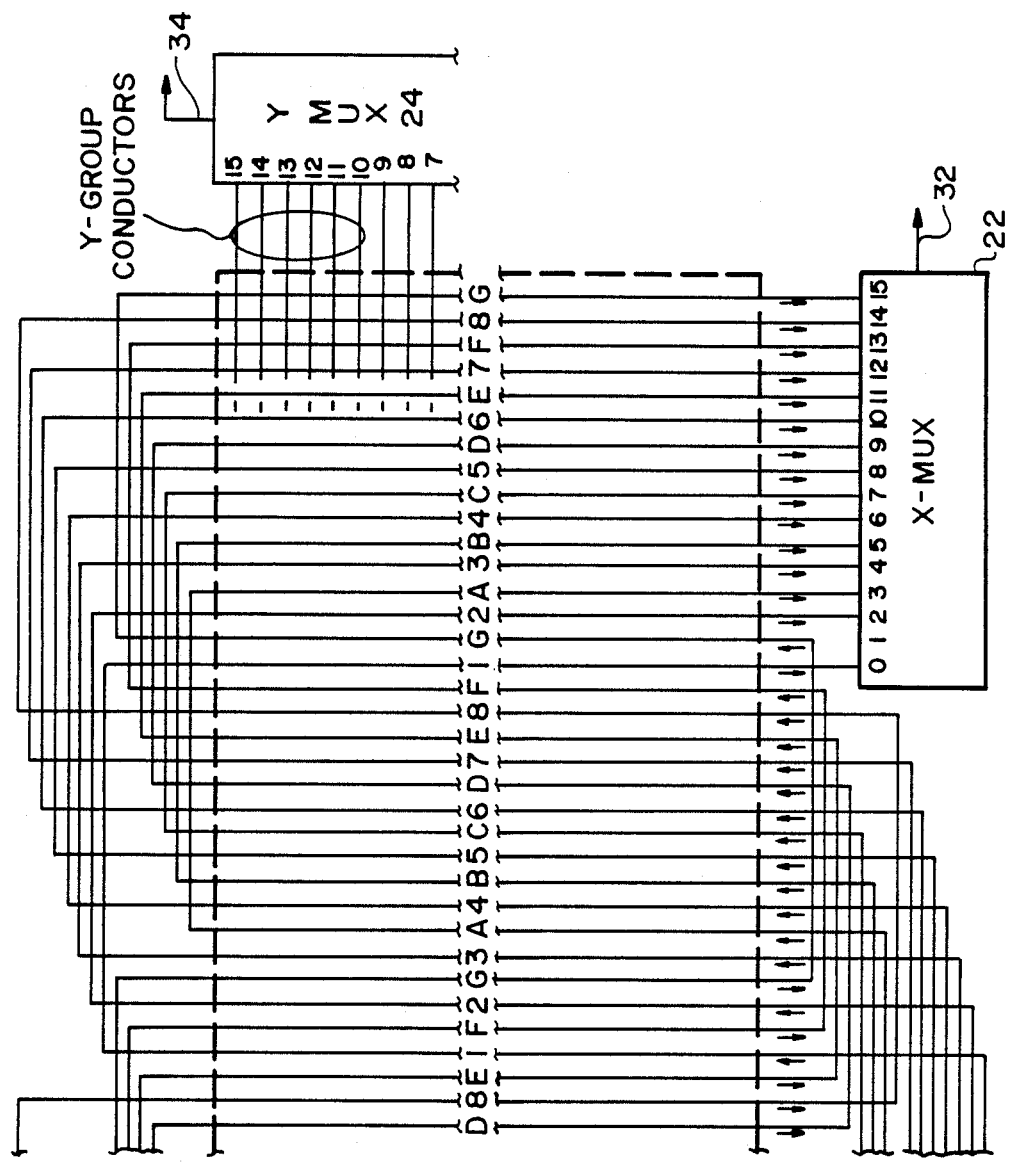

SHIFTING WIRE SEQUENCE DIGITIZER SYSTEM

BACKGROUND OF THE INVENTION

This invention relates to a method and apparatus for determining the position of a coil relative to a grid of spaced conductors, such as those involved in so-called pen digitizer systems, and more particularly, digitizer systems which achieve high resolution with substantial reductions in components and cost.

Various high resolution digitizer systems, which translate a position of a movable instrument, such as a pointer or pen, into electrical signals for transmission to a local or remote utilization device, are well known in the art.

U.S. Pat. No. 4,210,775 to James L. Rodgers et al discloses a digitizer system in which a pen having a coil disposed within its tip is utilized in conjunction with a support surface having an active area defined by a grid of conductors. The grid includes a group of parallel spaced conductors oriented in an X direction and a group of parallel spaced conductors oriented in a Y direction. An oscillator applies an AC signal of predetermined frequency and amplitude to the coil. The coil signal is inductively coupled to the conductors of the grid. Thereby inducing AC electrical signals in the conductors.

In accordance with the well known principles of electromagnetic theory, the magnitude and phase of the signals induced in the grid conductors depend on the location of the conductors relative to the coil. Generally, the signals from the conductors will have a zero magnitude at the center of the coil and maximum magnitude at the coil's periphery. Further, the phase of the signals on one side of the coil will be the reverse of (180° displaced from) the phase of the signals on the other side of the coil. The grid conductors in each group are scanned sequentially through the use of multiplexer circuitry to sequentially couple the induced signals to detection circuitry. A position counter is incremented in response to the oscillator as the conductors in each group are sequentially scanned.

The detection circuitry includes a phase sensitive detector and associated circuitry for generating a characteristic signal that changes polarity in response to a reversal in the phase of the induced signals as the conductors are scanned. As noted above, the phase of the induced signals reverses, and thus the polarity of the characteristic signal changes, as one steps from a conductor on one side of the coil to a conductor on the other side of the coil. This polarity change in the characteristic signal can thus be used to locate the coil relative to the conductors. The detection circuitry generates a stop signal that is coincident in time with the polarity change in the characteristic signal. The stop signal is used to disable the position counter which was being incremented during the scanning. Thus, the contents of the position counter when stopped represent the location of the coil with respect to the X group of conductors, and are loaded into an output register. The position counter is then reset, and the conductors of the Y group are scanned in a similar manner to load the output register with a second digital number representing the location of the coil with respect to the Y group of conductors.

U.S. Pat. No. 4,423,286 to Gary A. Bergeron discloses a digitizer system which, like that disclosed in the Rodgers patent, utilizes a coil in a pen to induce signals in an X and Y grid of spaced conductors. In the Bergeron system, however, the conductors of the grid are not scanned sequentially to locate the coil. Instead, addressable multiplexer circuitry in the Bergeron system first couples the center conductor of the X group to detection circuitry which detects the polarity of the signal induced therein. From this polarity and the above-noted principles of electromagnetic theory, a determination is made whether the coil is to the right or to the left of the center conductor. The multiplexer circuitry then couples to the detection circuitry the center conductor of the half section (right or left) in which the coil is known to be located. Again, from the polarity of the signal induced in that conductor, a determination is made as to the particular quarter section in which the coil is located. Additional samplings are taken in the same fashion until it is ascertained that the coil lies between two adjacent X group conductors.

The precise position of the coil between the two adjacent X group conductors is then determined by examining the respective magnitudes of the signals induced in the adjacent conductors. Specifically, a ratio of these signal magnitudes is formed which identifies the precise X location of the coil between the two conductors.

A like set of samplings and measurements is performed on the conductors of the Y group to obtain a precise Y location.

Typically, the active areas of digitizer systems of the above-described types include at least 64 separate conductors in the X group and 64 separate conductors in the Y group. Conventional multiplexers have either eight or 16 switchable inputs. Thus, at least 4 multiplexers (or eight, depending upon multiplexer type used) are required for coupling the conductors of the X group to the detection circuitry, and an additional four (or eight) multiplexers are required for coupling the conductors of the Y group to the detection circuitry. The need for plural multiplexers for each conductor group in the digitizer grid adds considerably to the cost and complexity of design of such systems.

In copending patent application, Ser. No. 026,217 entitled "Digitizer System With Loopback Conductor Grid", filed Mar. 16, 1987, now U.S. Pat. 4,734,546, and assigned to the same assignee hereof, a digitizer system of improved design is disclosed. That system utilizes a conductor loopback arrangement which substantially reduces the number of conductors required to span a given active area, and substantially reduces the number of multiplexers required to handle such conductors.

In accordance with the invention disclosed in that application, the grid active area is divided into a plurality of sections, and conductors are looped back and forth across the active area so that each conductor has a segment passing through each of the sections. One end of each conductor is grounded so that each crossing conductor segment has an "unexcited" or "directional" polarity defined in reference to its grounded end. The conductors are passed through the sections in a predetermined order so that the combination of the directional polarities of adjacent conductor segments is different in each section. Due to these known, but different directional polarities, each section of the grid active area is uniquely identifiable even though handled by the same conductors. Consequently, the number of separate conductors in each conductor group required to span the active area is reduced. Also, the number of multiplexers required to couple such conductors to induced signal detection circuitry is reduced. Thus, for example, by looping the conductors in pairs through four equally sized quarter sections of the grid active area, 16 conductors in each group can be used to span the same active area that formerly required 64 conductors, and one 16-input multiplexer can be used for each group that formerly required four such multiplexers. This reduction in conductors and components substantially reduces the cost of the digitizer system, while maintaining the high resolution and accuracy of existing systems.

The conductor loopback digitizer of copending application Ser. No. 026,217 preferably operates similarly to that disclosed in the above-referenced Bergeron patent, by first coarsely locating an inducing coil as being somewhere between two adjacent conductor segments by sampling the phase of the signals induced therein, and then precisely locating the coil between the two adjacent conductor segments by forming a ratio of the respective magnitudes of such signals. The result is a relatively simple, low cost digitizer system capable of very high resolution position determination.

In a typical conductor loopback digitizer, adjacent conductor segments are spaced from one another by about 0.4 inch or less. Thus, it is possible to span an active area in either the X or Y direction extending about 25.2 inches (63 spaces times 0.4 inch) using 16 conductors and one 16-input multiplexer. Often, digitizer systems require active areas larger than this. In such large area systems, either the spacing between adjacent conductor segments must be increased, or additional conductors and additional multiplexers must be used. In the former case, accuracy is sacrificed, while in the latter case, costs associated with components and manufacturing increase.

SUMMARY OF THE INVENTION

The present invention is aimed at providing a novel digitizer conductor grouping and looping arrangement which accommodates large grid active areas without sacrificing accuracy or significantly increasing component or manufacturing costs.

In accordance with the present invention, each of the X and Y conductor groups in a digitizer system is comprised of two or more conductor sets, each such set including a different number of conductors. The conductors in each of the sets are looped back and forth in a parallel spaced relationship across a grid active area, and the sets are interleaved relative to one another so that the crossing conductor segments alternate from one set to the other as one moves across the grid. Because the number of conductors in each set is different, the postional relationships of the individual conductors in the sets shift as one moves across the grid. Also, because the conductors in each set are looped back and forth across the grid, the directional polarities of the crossing conductor segments in each set shift (i.e., reverse) from one crossing of the set to the next crossing of the set. These shifting positional and directional polarity relationships permit induced signal processing circuitry to identify uniquely the two conductor segments which encompass a coil using a straightforward sequential scanning approach. Precise coil location between the segments can be achieved using a signal ratio approach.

In the illustrative embodiment of the invention described hereinbelow, the X and Y conductor groups are each comprised of two sets of conductors, with the first set consisting of eight conductors and the second set consisting of seven conductors. These sets are looped and interleaved across the grid active area as described above, with adjacent conductor segments being equally spaced from one another by 0.4 inch. With this arrangement, unique positional and directional polarity relationships between the individual conductor segments of the sets are obtained for up to 14 crossings of the first set, permitting one to span a grid active area dimension up to 89.6 inches (14 first set crossings times 16 spaces per first set crossing times 0.4 inch per space). This is more than three times the grid active area span achievable with the basic loopback arrangement disclosed in copending patent application Ser. No. 026,217. Also, since the total number of conductors in each X and Y group is only 15 (eight in the first set and seven in the second set), the necessary conductor switching can be handled by a single 16-input multiplexer for each group.

BRIEF DESCRIPTION OF THE DRAWING

The foregoing and other features and advantages of the invention will be better understood from the following detailed description taken with the accompanying drawing in which.

DETAILED DESCRIPTION OF PREFERRED EMBODIMENT

Figure 1:
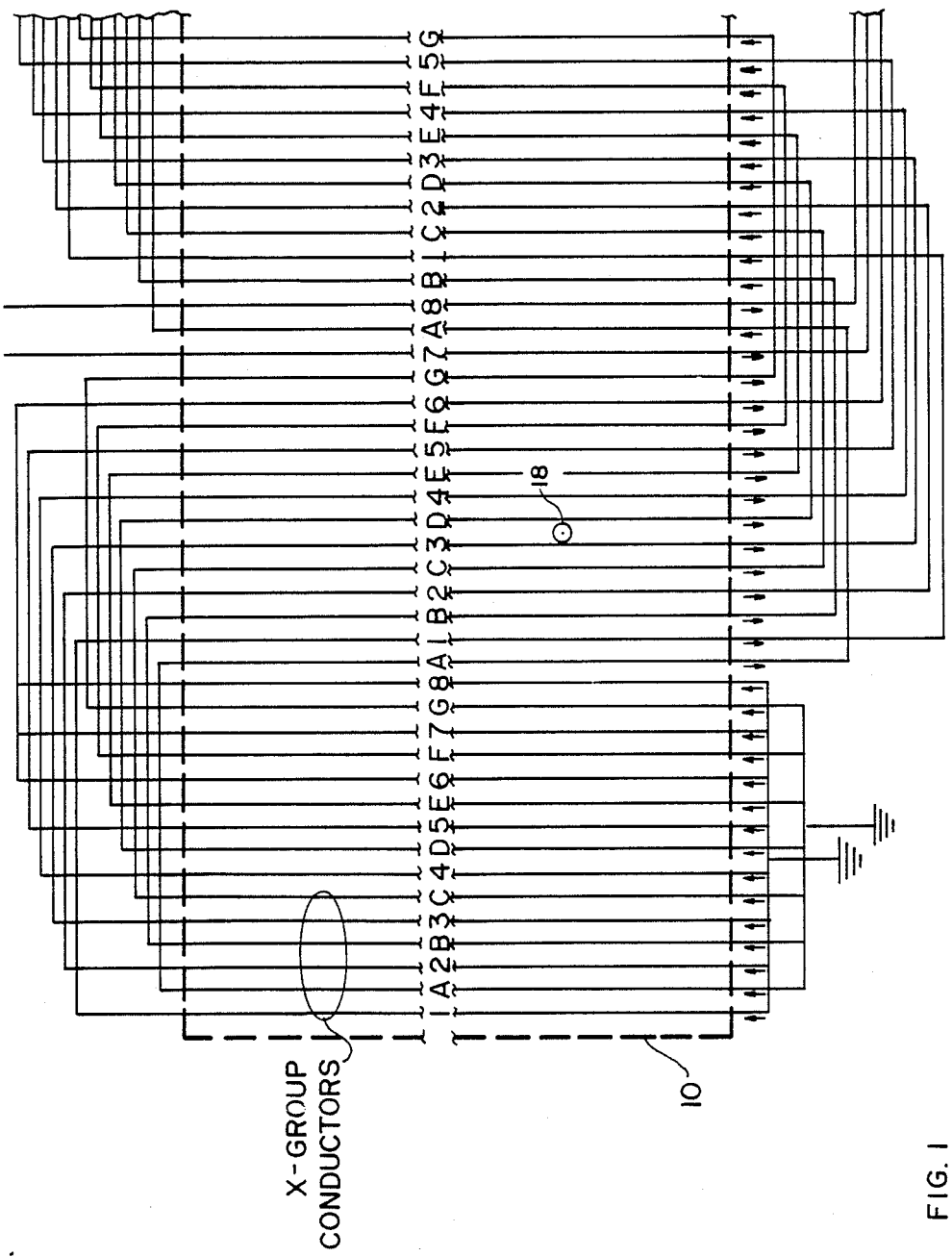
FIG. 1 is an illustration of a shifting wire sequence digitizer system conductor grid embodied in accordance with the invention.

Referring now specifically to the drawing, and initially to FIG. 1 thereof, there is shown a shifting wire sequence digitizer conductor grid embodied in accordance with this invention. The grid, which defines a digitizer active area 10, is comprised of a first group of conductors having a number n of parallel, equally spaced conductor segments oriented in an X direction (vertically in FIG. 1), and a second group of conductors having a number m of parallel, equally spaced conductor segments oriented in a Y direction (horizontally in FIG. 1). The total number n of conductors in the X group may or may not be selected to be equal to the total number m of conductors in the Y group, depending upon whether a square, rectangular or other shape is desired for the grid active area 10. A coil 18, illustratively disposed in the tip of a pen or pointer (not shown), is movable relative to the grid. The function of the digitizer system is to identify the position of the coil 18 on the grid precisely. This is accomplished in the preferred embodiment described herein by applying an AC signal to the coil 18 and by analyzing the electrical signals inductively coupled to the conductors of the grid by the coil 18.

In the preferred embodiment, the X group conductors are configured identically to the Y group conductors, except for the fact that the Y group conductors are oriented at 90 degrees to the X group conductors to form the grid. Because of this, only the X group conductor configuration will be described in detail.

The X group conductors include a first set and a second set of conductors. The first set of conductors consists of eight conductors labelled 1 through 8 in FIG. 1 which are looped back and forth across the grid active area 10. The second set of conductors consist of seven conductors labelled A through G in FIG. 1 which are also looped back and forth across the grid active area 10 and interleaved between the crossing conductor segments of the first set, so that the segments alternate from one set to the other as one moves across the grid active area 10. As shown in FIG. 1, one end of each of the conductors in each of the first and second sets is connected to ground, while the other end of each of the conductors in the two sets is connected to one of the input gates of an X-multiplexer 22. The X-multiplexer 22 is capable of switching any selected one of the conductors connected to its inputs to signal processing circuitry to be described later.

As noted earlier, the unexcited or directional polarity of each conductor segment in each set is defined with reference to its grounded end. For purposes of this description, it will be assumed that a conductor segment that has its lower end, as seen in FIG. 1, grounded has a positive directional polarity. A segment with its upper end grounded has a negative directional polarity. The arrow just to the left of and near the lower end of each conductor segment in FIG. 1 indicates its directional polarity.

It will be appreciated from FIG. 1 that, as one moves across the grid active area 10, the individual conductors in the first and second sets shift in position relative to one another. For example, at the extreme left of the active area 10, conductor A of the second set is to the immediate right of conductor 1 of the first set. In their next crossing, conductor A of the second set is to the immediate left of conductor 1 of the first set. This positional shifting, which is due to the fact that each set includes a different number of conductors, continues all the way to the extreme right of the active area 10.

It will also be appreciated from FIG. 1 that, in the first crossing of conductors 1–8 of the first set and conductors A–G of the second set, the directional polarities of the crossing segments are all positive. In the second crossing of the conductors of both sets, the directional polarities of the crossing segments are all negative. The directional polarities of the conductors in each set continue to shift back and forth (i.e., reverse) with each successive crossing.

The positional and directional polarity relationships between the conductors of the first and second set are unique for a total of 14 crossings of the first set and 16 crossings of the second set. In a 15th crossing of the first set and 17th crossing of the second set, the positional and directional polarity relationships are the same as in the first crossing of the two sets. These unique relationships enable signal processing circuitry to handle each crossing segment in each set as if it were a separate and distinct "wire".

When the coil 18 is excited by an AC signal, it will induce a large magnitude signal in the conductor segment to its immediate left and a large magnitude signal of opposite phase in the conductor segment to its immediate right. When these AC signals are processed so as to produce DC voltages of proportional magnitude and polarities which are determined by their phase relative to the AC coil voltage, the result is a large positive voltage on the segment to the left of the coil 18 and a large negative voltage on the segment to the right of the coil 18. Normally, this transition is from a large positive for the segment on the left of the coil 18 to a large negative for the segment on the right of the coil 18. However, the directional polarities of the conductor segments affect the polarities of the processed signals. The two conductor segments that encompass the coil 18 can be identified by sequentially scanning the conductors from the two sets in an interleaved order which alternates between the first set and the second set, adjusting the polarities, where appropriate, to account for the shifts in the directional polarities of the segments, and searching for the point where the detected signals transition from a large magnitude positive to a large magnitude negative. Once the two conductor segments that encompass the coil 18 are identified, the coil 18 can be more finely located between the two segments using a signal magnitude ratio approach.

As noted, the conductors of the first set can be looped across the grid active area 10 a total of 14 times before the positional and directional polarity pattern of the two sets repeats itself. Due to the interleaving with the second set conductors, there are a total of 16 spaces between adjacent conductor segments in each first set crossing. Consequently, a total of 224 spaces (14 times 16) can be achieved before the pattern repeats itself. If the spacing "d" between adjacent conductor segments is 0.4 inch, the active area span achievable is 89.6 inches, which is more than three times the active area span achievable under comparable conditions with the basic loopback arrangement disclosed in copending patent application Ser. No. 026,217. Also, since the total number of conductors in each X and Y group is only 15, the necessary switching functions can be achieved with only one 16-input multiplexer for each group.

Figure 2:
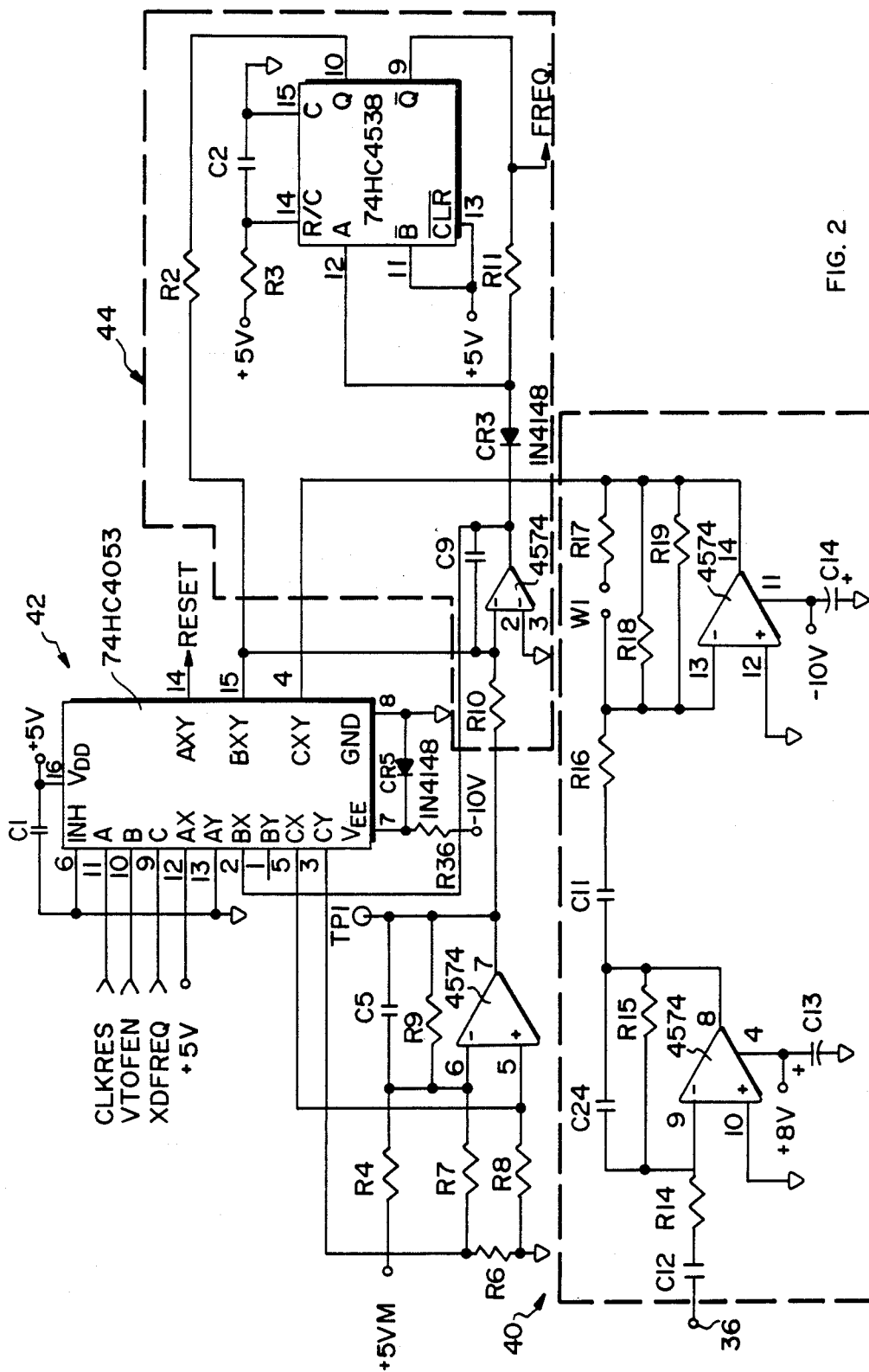
FIG. 2 illustrates circuitry for detecting electrical signals induced in the conductors of the grid of FIG. 1 and for digitizing such signals for further processing.

FIG. 2 illustrates circuitry for detecting the AC electrical signals induced in the conductors of the grid active area 10 by the coil 18. As shown in FIG. 1, the X-multiplexer 22 and a corresponding Y-multiplexer 24 for the Y group conductors have outputs 32 and 34, respectively. These outputs 32 and 34 are connected to input 36 of the detection circuitry of FIG. 2. As noted earlier, the multiplexer 22, when enabled, selects one of its 16 inputs 0 through 15 for coupling to its output 32, and thence to the input 36 of the circuitry of FIG. 2. In this embodiment, input 1 to the multiplexer 22 is not used since the grid includes only 15 conductors. Similarly, the multiplexer 24, when enabled, selects one of its 16 inputs 0 through 15 for coupling to its output 34, and thence to the input 36 of the circuitry of FIG. 2. Thus, each conductor in the X group and Y group of the grid can be separately coupled to the detection circuitry of FIG. 2 so that the AC signal induced therein by the coil 18 can be analyzed.

The AC signal coupled to input 36 is first passed through an amplifier and filter circuit 40 which provides the proper operating signal levels for the system and filters out noise and other unwanted signal components. The output of the amplifier and filter circuit 40 is applied to a synchronous demodulator 42 which converts the input AC signal to a DC signal. As discussed more fully below, the demodulator 42 is synchronized with the AC signal used to excite or drive the coil 18. The DC signal that is outputted by the synchronous demodulator 42 has a voltage that is proportional to the amplitude of the AC signal that is applied to the input 36, and a polarity that corresponds to that signal's phase.

The output of the synchronous demodulator 42 is biased so as to yield a unipolar voltage and then applied to an analog-to-digital converter such as the voltage-to-frequency converter 44 shown in the example of FIG. 2. The converter 44 converts the biased DC voltage output from the demodulator 42 to a variable frequency signal FREQ. The frequency of the signal FREQ deviates from a predetermined value in proportion to the DC voltage at the output of the synchronous demodulator 42, with the magnitude of the deviation being proportional to the voltage, and the direction of the deviation corresponding to its polarity. The signal FREQ is coupled to the circuitry shown in FIG. 3 for further processing.

Figure 3:
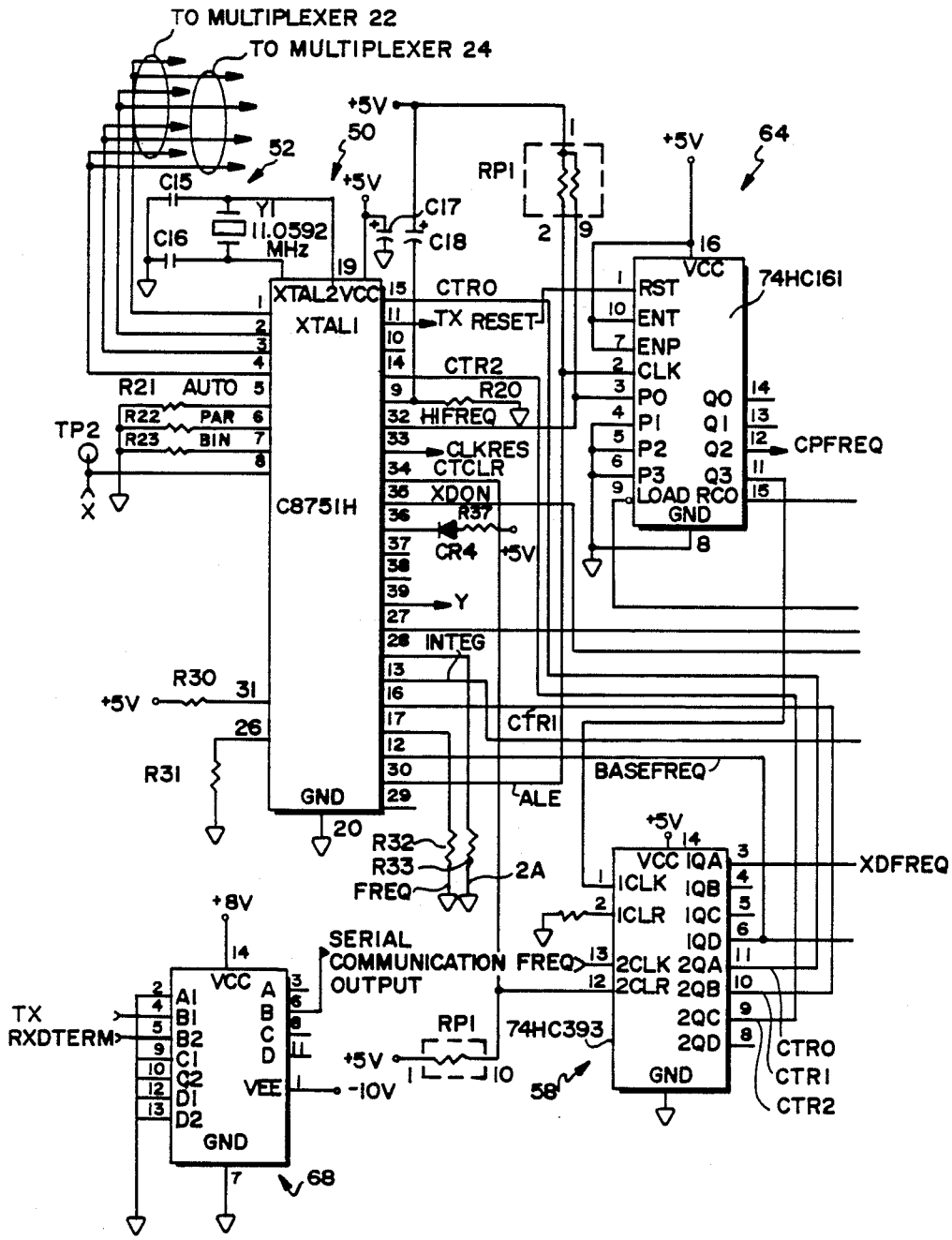
FIG. 3 illustrates circuitry including microprocessor means for processing the digitized signals developed by the circuitry of FIG. 2 and for controlling multiplexer means shown in FIG. 1 during the sampling of the conductors of the digitizer system grid.
Figure 3:
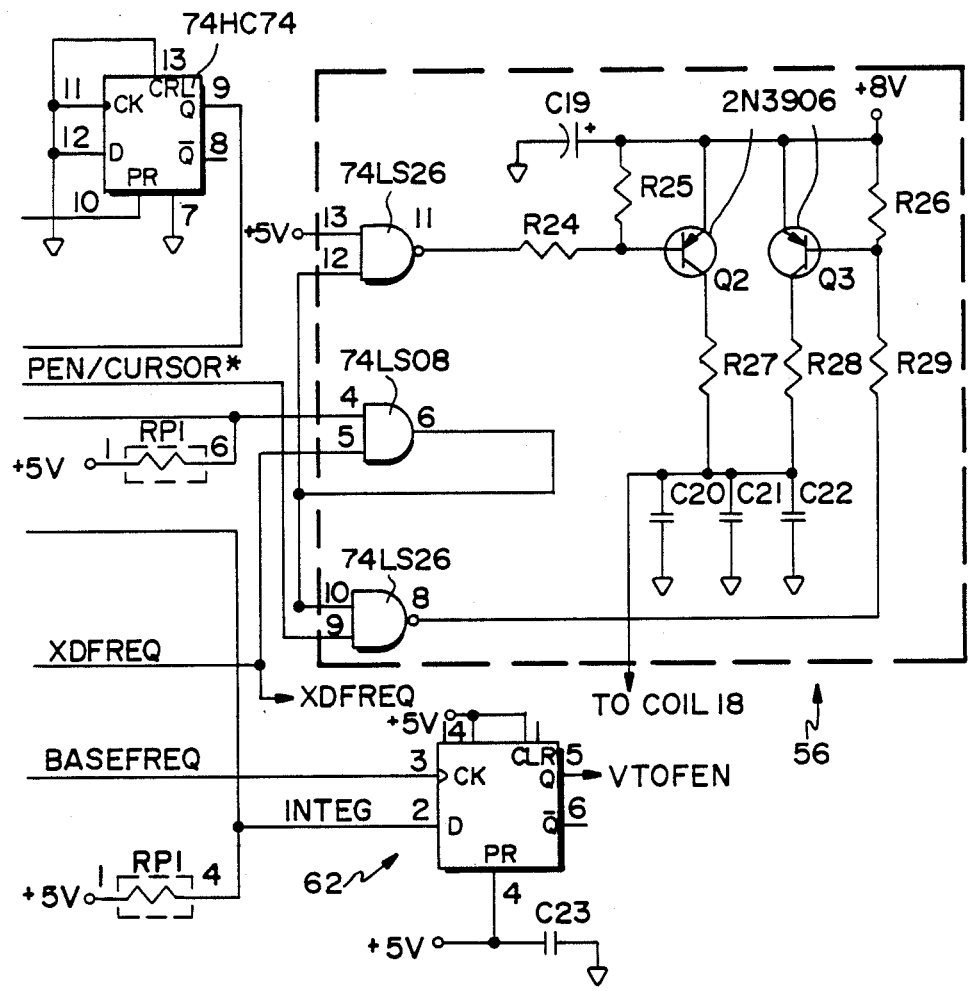

In the circuitry of FIG. 3, a microprocessor 50 is suitably connected to, and programmed to control the sampling of the conductors of the grid. The outputs of the microprocessor 50 at pins 1 through 4 are address signals which are coupled to address inputs (not shown) to the X-multiplexer 22 and Y-multiplexer 24 of FIG. 1. The microprocessor 50 also has outputs at pins 8 and 39 which are respectively coupled to an X-enable input (not shown) of multiplexer 22 and Y-enable input (not shown) of multiplexer 24. When the microprocessor 50 emits an X-enable signal, it enables multiplexer 22, and disables multiplexer 24. Similarly, when the microprocessor 50 emits a Y-enable signal, it enables multiplexer 24, and disables multiplexer 22. The address signals specify the selected one of the multiplexer inputs 0 through 15, and thus the selected one of the conductors, that is coupled to the input 36 of the detection circuitry of FIG. 2.

An oscillator 52 controls the timing of the microprocessor 50, enabling it to generate various timing signals to control the other components in the circuitry of FIG. 3. For example, the output of the microprocessor 50 at pin 30 is divided down in frequency by counter 64 and then counter 58 to generate the AC signal XDFREQ which is used to drive the coil 18 and as the phase reference signal for the synchronous demodulator 42.

The signal FREQ from the voltage-to-frequency converter 44 of FIG. 2 is inputted to the counter 58 of FIG. 3. The counter 58 operates in conjunction with a counter internal to microprocessor 50 at pin 14 to generate digital numbers indicative of the phase and magnitude of the induced signals detected by the detection circuitry of FIG. 2. The microprocessor 50 utilizes these digital numbers in the sampling of the conductors of the grid to locate the coil 18 relative to the grid. As explained in more detail below, the microprocessor 50 changes the polarities represented by the digital numbers, where appropriate, to account for the shifting directional polarities of the conductor segments of the first and second sets as they are sequentially scanned. Once the microprocessor 50 finds a five conductor segment group wherein one conductor segment is preceded by two large positive signal conductor segments and followed by two large negative signal conductor segments, it coarsely locates the coil 18 as being somewhere between the last positive and the first negative conductor segments of that five wire group. Once this coarse location determination is made, the microprocessor 50 generates a ratio of the magnitudes of the signals induced in the two particular conductor segments encompassing the coil 18. This ratio is used by the microprocessor 50 to interpolate the distance between the two segments, and thereby to precisely locate the position of the coil 18 therebetween.

The serial output of the microprocessor 50 at pin 11 is indicative of coil position, and is coupled to a transmitter circuit 68 to enable transmission of such data to auxiliary equipment such as a computer, video display, or the like.

Other details of the circuitry will be evident to those skilled in the art from the integrated circuit designations, signal labels and connections and other specific information provided by way of illustration in FIGS. 2 and 3.

Figure 4:
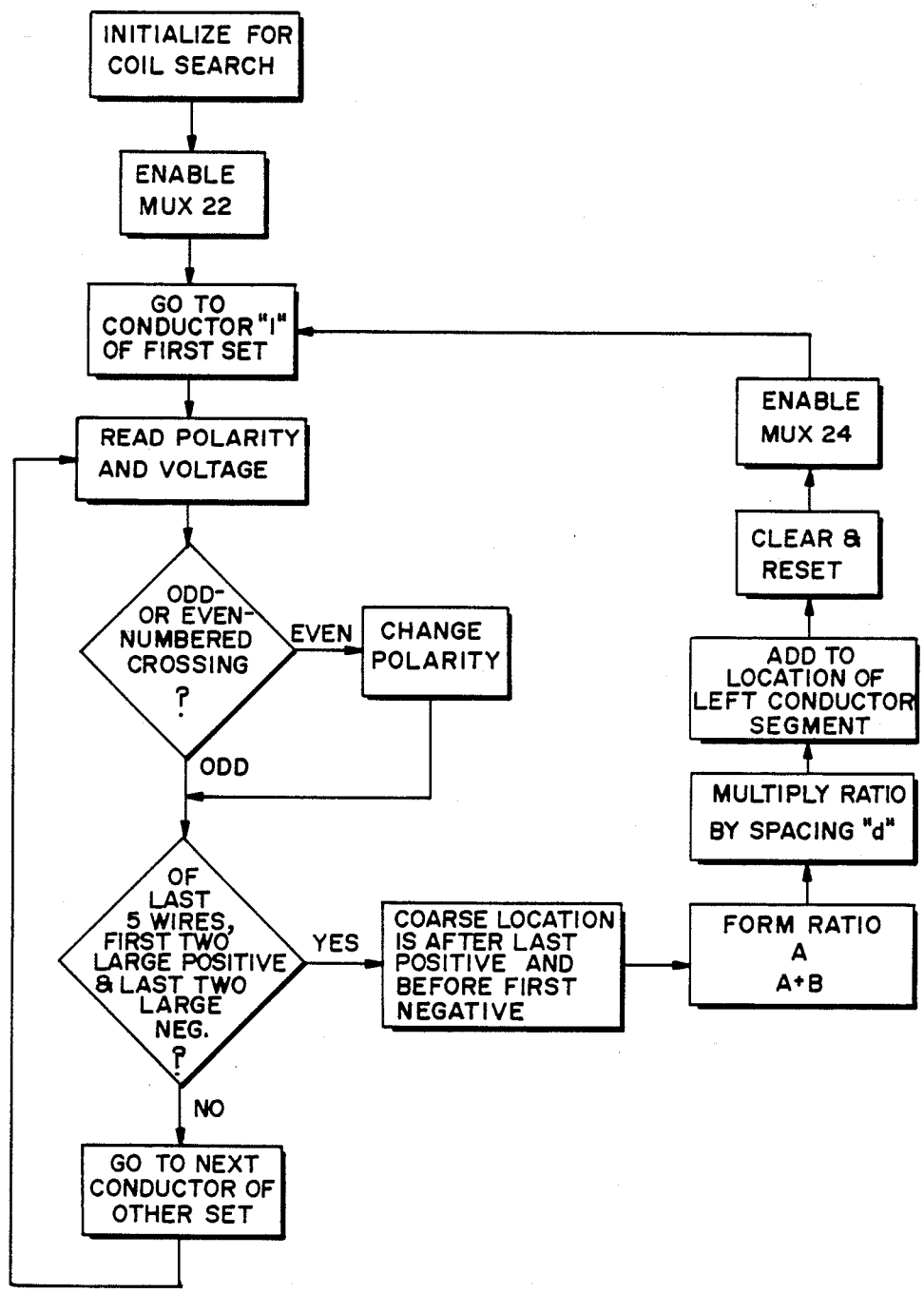
FIG. 4 is a generalized flow chart illustrating the operation of the microprocessor means of FIG. 3.

FIG. 4 is a generalized flow chart illustrating the operation of the microprocessor 50. The microprocessor 50, and the circuit components which it controls, are first initialized in preparation for the search for the coil 18. This is followed by the enablement of X-multiplexer 22 and by a scan sequence which involves a sequential scanning of the conductors of the first and second sets in the X group in an interleaved manner, i.e., alternating between a given conductor from the first set and a given conductor from the second set. Thus, input 0 of multiplexer 22 is enabled first to sample conductor 1 of the first set, followed by input 3 to sample conductor A of the second set, followed by input 2 to sample conductor 2 of the first set, followed by input 5 to sample conductor B of the second set, and so on.

After the first pass through the conductors of each set, the microprocessor 50 will sample the conductors in alternating order a second time but for the second pass, will reverse the polarities of the detected signals to account for the fact that the directional polarities of the second crossings of each set are negative. Indeed, for each even-numbered crossing, the polarities of the detected signals are reversed, while for each odd-numbered crossing, the polarities are maintained as is.

The microprocessor 50 continues this sequential sampling procedure until it determines that it has located a group of five conductor segments wherein the first two conductor sements have a large magnitude positive signal and the last two conductor segments have a large magnitude negative signal, and has thus coarsely located the coil 18 within one wire spacing of the center of the five conductor segments. In the example shown in FIG. 1, the microprocessor 50 will locate the above described polarity sequence pattern after sampling conductors C,3,D,4 and E for the second time.

As noted earlier, the preferred embodiment is adapted to precisely locate the coil 18 between the two immediately adjacent conductor segments using a ratio technique. In this respect, the microprocessor 50 forms a ratio r according to the following equation:

$$r = (A/A + B)$$

where A is the magnitude or absolute value of the signal on the conductor segment to the immediate left of the coil 18, and B is the magnitude or absolute value of the signal on the conductor segment to the immediate right of the coil 18. Absolute values are used because the polarity of the signal on the left conductor segment is positive while the polarity of the signal on the right conductor segment is negative. The microprocessor 50 multiplies that ratio by the spacing "d" between the two segments. The result is added to the location of the left segment to obtain a precise coil position within the X group, and this precise X position is saved.

After clearing and resetting the circuit components which were operated to effect the determination of the coil 18 relative to the X group, the microprocessor 50 disables the X-multiplexer 22, enables the Y-multiplexer 24 and repeats the above described search routine to obtain a precise coil position within the Y group.

It will be appreciated that, with integrated circuit components of the type illustrated in FIGS. 2 and 3, all of the above described operations can be carried out at very high speeds, so that the coil 18 is precisely located relative to the grid active area 10 within fractions of a second. Specific microprocessor program implementations of the generalized flow chart of FIG. 4 will be readily apparent to those skilled in the art.

It should be understood that the above-described embodiment is intended to illustrate rather than limit the invention. Various modifications to the specifically disclosed circuitry and generalized flow chart will suggest themselves to those skilled in the art.

For example, the use of eight and seven conductors, respectively, in the first and second sets is simply one example of many other possible combinations and was illustrated for its applicability to a 16-input multiplexer. Nine and seven conductors also work as well as other combinations such as 17 and 15 with a 32-input multiplexer and 5 and 3 with an 8-input multiplexer.

Also if sufficient memory is available in the microprocessor, the voltage of all the conductors could be acquired and stored in memory. Then rather than reacquiring the voltages in the sequence in which the conductors appear on the grid, the stored voltages could be sequentially reviewed thereby saving acquisition time.

Additionally, it will be appreciated that, while the preferred embodiment involved driving or exciting the coil 18 to induce signals in the conductors of the grid, that embodiment can be modified to one in which the drive signal is selectively switched by the multiplexers 22 and 24 to respective conductors of the grid to induce signals in the coil 18 which are then detected and processed by the circuitry of FIGS. 2 and 3.

It is accordingly the intent of the appended claims to cover these and other modifications that come within the true and reasonable scope of the invention.

I claim:

1. Apparatus for determining the position of a coil with respect to an active area, comprising:
   (a) a grid of conductors defining said active area, said grid including a first group of n parallel, spaced conductors oriented in an X direction and a second group of m parallel, spaced conductors oriented in a Y direction, each of said groups including a first set of conductors and a second set of conductors;
   (b) said first sets including a predetermined number of conductors that are looped back and forth across said active area a plurality of times so as to provide a plurality of crossing conductor segments;
   (c) said second sets including a predetermined number of conductors that is different from the number of conductors in said first set, said second set conductors being looped back and forth across said active area between said first set conductors so as to provide a plurality of second set crossing conductor segments alternating with said first set crossing conductor segments;
   (d) means for exciting either
      i. said coil to induce electrical signals in said conductors, or
      ii. selected ones of said conductors to induce electrical signals in said coil, said induced signals having a magnitude and polarity depending upon the position of said coil relative to said conductors;
   (e) means for detecting the induced signals; and
   (f) switching means for selectively switching said conductors to either
      i. said detecting means; or
      ii. said exciting means.

2. The apparatus of claim 1 wherein said exciting means comprises means for exciting said coil to induce said signals in said conductors, and wherein said switching means comprises means for selectively switching said conductors to said detecting means.

3. The apparatus of claim 2 wherein said switching means switches said conductors to said detecting means sequentially alternating between one of said first set conductors and one of said second set conductors so as to coarsely locate said coil between two adjacent crossing conductor segments.

4. The apparatus of claim 2 further including means for generating a ratio of the magnitudes of the signals induced in said two adjacent crossing conductor segments of said sets so as to precisely identify the position of said coil between said two particular adjacent conductor segments.

5. The apparatus of claim 4 wherein said ratio generating means comprise microprocessor means which also control said switching means.

6. The apparatus of claim 2 wherein one end of each of said conductors in each of said first and second sets is connected to ground, and wherein said switching means comprises multiplexer means for selectively switching the other ends of said conductors to said detecting means.

7. The apparatus of claim 6 wherein each crossing conductor segment has a predetermined directional polarity defined in reference to the grounded end of said conductor of which it is a part.

8. The apparatus of claim 7 further including means for selectively changing the polarities of the detected signals in accordance with the directional polarities of said crossing conductor segments.

9. The apparatus of claim 8 wherein said polarity changing means comprises microprocessor means.

10. The apparatus of claim 1 wherein said switching means comprises multiplexer means for each said conductor group, said multiplexer means having a plurality of inputs and an output, and wherein said multiplexer inputs are sufficient in number to receive respectively said conductors from said first and second sets.

11. A method for determining the position of a coil with respect to an active area defined by a grid of conductors, the grid including a first group of n parallel, spaced conductors oriented in an X direction, and a second group of m parallel spaced conductors oriented in a Y direction, each of said groups including a first set of conductors and a second set of conductors, said method comprising the steps of:
   (a) forming said first sets by looping a predetermined number of conductors back and forth across the active area a plurality of times so as to provide a plurality of crossing conductor segments;
   (b) forming said second sets by looping a predetermined number of conductors that is different from the number of conductors in said first set back and forth across the active area between said first set conductors so as to provide a plurality of second set crossing conductor segments alternating with said first set crossing conductor segments;
(c) exciting either
  i. the coil to induce electrical signals in the conductors, or
  ii. selected ones of the conductors to induce electrical signals in the coil, the induced signals having a magnitude and polarity depending upon the position of the coil relative to the conductors; and
(d) selectively switching the conductors to either
  i. means for detecting the induced signals; or
  ii. means for exciting the conductors.

12. The method of claim 11 wherein said exciting step comprises the step of exciting the coil to induce the signals in the conductors, and wherein said switching step comprises the step of selectively switching the conductors to the induced signal detecting means.

13. The method of claim 12 wherein said switching step comprises the step of switching said conductors to the detecting means sequentially alternating between one of said first set conductors and one of said second set conductors so as to coarsely locate the coil as being between two adjacent conductor segments.

14. The method of claim 12 further including the step of generating a ratio of the magnitudes of the signals induced in the two adjacent conductor segments so as to precisely identify the position of the coil between the two adjacent conductor segments.

15. The method of claim 12 wherein one end of each of the conductors in each of said sets is connected to ground, and wherein said switching step comprises the step of selectively switching the other ends of the conductors to the induced signal detecting means.

16. The method of claim 15 wherein each crossing conductor segment has a predetermined directional polarity defined in reference to the grounded end of the conductor of which it is a part, and wherein said method further includes the step of changing the polarities of the detected signals in accordance with the directional polarities of the crossing conductor segments.

17. The method of claim 11 wherein said switching step comprises the steps of connecting said conductors of said first and second sets to multiplexer means having a sufficient number of inputs to receive respectively said first and second set conductors, and controlling the multiplexer means to select one of its inputs.

18. Apparatus for determining the position of a coil with respect to an active area, comprising:
(a) a grid of conductors defining said active area, said grid including a first group of parallel, spaced conductors oriented in an X direction and a second group of parallel, spaced conductors oriented in a Y direction, each of said groups including a first set of conductors and a second set of conductors, one end of each of said conductors in each of said groups being connected to ground;
(b) said first sets including a predetermined number of conductors that are looped back and forth across said active area a plurality of times so as to provide a plurality of crossing conductor segments;
(c) said second sets including a predetermined number of conductors that is different from the number of conductors in said first set, said second set conductors being looped back and forth between said conductor of said first sets so as to provide a plurality of second set crossing conductor segments alternating with said first set crossing conductor segments;
(d) a coil movable relative to said grid;
(e) means for exciting either
  i. said coil to induce electrical signals in said conductors, or
  ii. selected ones of said conductors to induce electrical signals in said coil, the induced signals having a magnitude and polarity depending upon the position of said coil in respect to said conductors;
(f) means for detecting the magnitude and polarity of the induced signals;
(g) multiplexer means for selectively switching the other ends of said conductors to either
  i. said detecting means; or
  ii. said exciting means; and
(h) microprocessor means for controlling said detecting means and said multiplexer means.

19. The apparatus of claim 18 wherein said exciting means comprises means for exciting said coil to induce said signals in said conductors and wherein said multiplexer means comprises means for selectively switching the other ends of said conductors to said detecting means.

20. The apparatus of claim 19 wherein said multiplexer means is addressable to select the one of said conductors that is switched to said detecting means, and wherein said microprocessor means controls said multiplexer means by transmitting address signals to said multiplexer means.

21. The apparatus of claim 18 wherein said microprocessor means controls said multiplexer means to switch said conductors to said detecting means sequentially alternating between one of said conductors from said first set and one of said conductors from said second set.

22. The apparatus of claim 19 wherein each of said crossing conductor segments has a predetermined directional polarity defined in reference to the grounded end of said conductor of which it is a part and wherein said microprocessor means changes the polarities of the signals detected by said detecting means in accordance with the directional polarities of said segments.

* * * * *